United States Patent

[11] 3,627,828

[72] Inventor Stanley B. Mirviss
Stamford, Conn.
[21] Appl. No. 789,973
[22] Filed Dec. 30, 1968
[45] Patented Dec. 14, 1971
[73] Assignee Stauffer Chemical Company
New York, N.Y.

[54] HYDROXY BENZOYL BENZOIC THIOLANHYDRIDE
2 Claims, No Drawings

[52] U.S. Cl........................................ 260/545 R,
260/45.75 U, 260/45.95
[51] Int. Cl.......................................... C07c 153/00
[50] Field of Search............................ 260/545

[56] References Cited
UNITED STATES PATENTS
3,466,307   9/1969   Stamm et al..................   260/399
FOREIGN PATENTS
115,538   7/1965   Czechoslovakia..............   260/473

Primary Examiner—Lewis Gotts
Assistant Examiner—Robert Gerstl
Attorneys—Robert C. Sullivan, Donald M. MacKay, Daniel C. Block, Paul J. Juettner, Martin Goldwasser and Wayne C. Jaeschke

ABSTRACT: Vinyl polymer compositions are stabilized against degradation and discoloration due to heat by adding to the polymer a stabilizing amount of a novel compound of the formula:

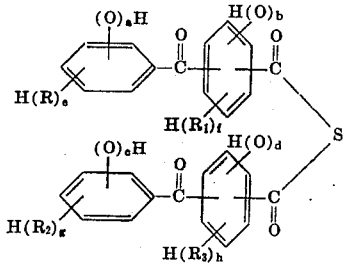

wherein $R$, $R_1$, $R_2$ and $R_3$ are divalent acyclic essentially hydrocarbon radicals containing from one to about six carbon atoms, $a$ and $c$ are integers having values of from 0 to 1 inclusive, $b$ and $d$ are integers having values of from 0 to 1 inclusive, and $e$, $f$, $g$ and $h$ are integers having values of 0 to 1.

HYDROXY BENZOYL BENZOIC THIOLANHYDRIDE

BACKGROUND OF THE INVENTION

The present invention relates to a new class of hydroxy benzoyl benzoic thiolanhydride compounds and the vinyl polymer compositions having incorporated therein these new hydroxy benzoyl benzoic thiolanhydride compounds to impart heat stability to the polymer composition.

SUMMARY OF THE INVENTION

According to the present invention, there is provided novel compounds of the formula;

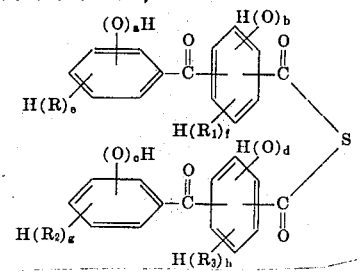

wherein $R$, $R_1$, $R_2$ and $R_3$ are divalent acyclic essentially hydrocarbon radicals containing from one to about six carbon atoms, $a$ and $c$ are integers having values of from 0 to 1 inclusive, $b$ and $d$ are integers having values of from zero to 1 inclusive, and $e$, $f$, $g$, and $h$ are integers having values of zero or one; and heat stable compositions comprising the novel compounds and vinyl polymers.

The present invention provides a novel class of compounds which are found to be particularly effective in heat stabilizing vinyl polymers such as the polyvinyl halides, polyvinylidene halides, polyethylene, polypropylene, acrylonitrile-butadiene-styrene composition, chlorinated polyethylene, copolymers made from monomers at least one of which is a halogen containing monomer, and post chlorinated polymers. The compounds of the present invention also activity as ultraviolet light stabilizers for vinyl and other polymers. Detailed description of the Invention The term divalent acyclic essentially hydrocarbon radical as used herein is intended to denote substituted alkylene or alkyleneoxy radicals containing from 1 to about 6 carbon atoms. It is understood that such radicals can contain other groups which do not substantially change the nature of the hydrocarbon group. Such groups can contain nitrogen, oxygen, or halogen with a molecular weight between 16 and 88. Specifically, the radicals could contain an amino group or have a chlorine or bromine substituent in the acyclic radical. The term halogen is used herein to denote fluorine, chlorine, bromine and iodine.

Representative compounds within the scope of the present invention include:

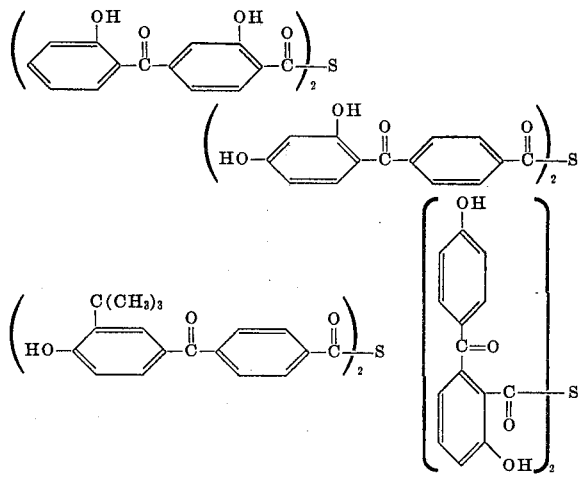

The novel compounds of the present invention are particularly effective stabilizing agents when the hydroxy group is substituted in an ortho position to the carboxy or carbonyl groups and especially when the hydroxy group in an ortho position to the carboxy or carbonyl group has an acyclic essentially hydrocarbon radical substituted in an ortho position thereto.

The novel thiolanhydrides of the present invention can be prepared in good yields by reacting a thiolacid and an acyl chloride in a suitable solvent at from $-10°$ C. to about $120°$ C. The temperature range depends upon the particular reactants involved and the solvent employed. The reaction may be carried out at from subatmospheric to superatmospheric pressure. Provision must, however, be made for removal of the HCl formed from the reaction. This may be accomplished by using an acid acceptor such as pyridine or by the use of an inert gas purge when operating near atmospheric pressure.

Solvents suitable for the reaction are aromatic solvents such as benzene, toluene and xylene, chlorinated solvents such as chloroform, carbon tetrachloride and chlorobenzene, paraffinic solvents such as heptane, hexane and cyclohexane, and solvents such as tetrahydrofuran, dimethyl formamide and pyridene.

For example, 2-hydroxy-benzoyl-4'benzoic thiolanhydride can be prepared by reacting 2-hydroxy-benzoyl-4'-benzoyl chloride and 2-hydroxy-benzoyl-4'-benzoic thiolacid in diethyl ether at reflux temperatures. When no HCl is observed evolving from the reaction, the diethyl ether is removed and 2-hydroxy-benzoyl-4'-benzoic thiolanhydride is crystallized.

The acyl chlorides useful for the practice of the present invention can be prepared by the reaction of the desired acid with phosphorous trichloride.

The thiolacid can be prepared by reacting an acyl chloride with H2S in an anhydrous acid acceptor such as pyridine at from $0°$ C. to about $130°$ C. Preferably from about $5°$ C. to about $50$ C.

The thiolic anhydrides useful in the practice of the present invention can also be prepared by reacting a suitable acid chloride with a slight excess of $Na_2S$ in a solution with water at from $-5°$ C. to about $100°$ C. The reaction can be conducted at subatmospheric to superatmospheric pressure. The thiolanhydride can be recovered from the water. This method is at times the preferred method for preparing thiolanhydride compounds for the thiolanhydride can be recovered from the water phase, and little subsequent purification is necessary to recover a useable material.

The term vinyl polymer as used herein denotes those solid homopolymers, copolymers, terpolymers and post chlorinated polymers which require heat stabilization made from ethylenically unsaturated monomers by an addition polymerization reaction. Included within the definition of ethylenically unsaturated materials useful in the preparation of polymers suitable for the practice of the present invention are the vinyl halide monomers of the formula;

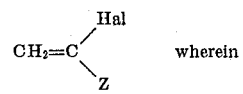    wherein

Z can be selected from halogen or hydrogen and Hal is halogen for example, vinyl chloride, vinyl bromide, vinylidene chloride and the like; mono-olefinic hydrocarbons such as ethylene and propylene; styrene and its nuclear, alpha-alkyl or aryl substituted derivatives such as p-methyl or butyl styrene; alpha-methyl or propyl styrene; phenyl styrene and halogenated styrenes such as alpha-chlorostyrene; mono-olefinically unsaturated esters including vinyl esters, e.g., vinyl acetate, vinyl stearate and vinyl benzoate; alkyl methacrylates, e.g. methyl and propyl methacrylate; alkyl crotonates; alkyl acrylates, e.g., methyl acrylate, hydroxy ethyl acrylate, and tertiary butylamino acrylate; isopropenyl esters; isopropenyl halides; vinyl esters of halogenated acids; alkyl and methallyl esters; esters of alkenylalcohols; haloalkyl acrylates; alkyl alpha-cyano acrylates; maleates, e.g. monomethyl maleate, diethyl maleate; fumarates e.g., monoethyl fumarate and dimethyl fumarate; diethyl glutaconate; mono-olefinically unsaturated organic nitriles such as fumaronitrile, acrylonitrile and methacrylonitrile; mono-olefinically unsaturated carboxylic acids such as cinnamic, maleic and fumaric and maleic anhydride and the like. Amides of these acids are also useful. Vinyl ethers and vinyl alkyl ethers, vinyl sulfides such as vinyl β-chloroethyl sulfide can also be utilized. Diolefinically unsaturated hydrocarbon containing two olefinic groups in conjugated relation and the halogenated derivatives such as butadiene-1,3 and 2 chloro-butadiene-1,3, can also be utilized in the preparation of suitable polymer compositions.

The terms vinyl halide polymer, ethylene polymer, and propylene polymer are used herein to denote homopolymers, copolymers and terpolymers of the named monomer and suitable monomers which can be polymerized by an addition polymerization reaction. The following are examples of copolymers which can be used in the practice of the present invention: vinyl chloride-vinyl acetate, vinyl chloride-vinylidene chloride, vinyl chloride-acrylonitrile, vinyl chloride-maleate esters, vinyl chloride-vinyl ethers, vinyl chloride-ethylene vinyl chloride-propylene, ethylene-vinyl acetate, ehtylene-acrylonitrile. The examples are illustrative only and are not intended to be exhaustive of the many copolymers whose stability can be enhanced by the compounds of the present invention.

The proportion of the hydroxy-benzoyl-benzoic thiolanhydride of the present invention which must be employed to make satisfactory heat stabilized compositions will vary over a wide range depending upon the particular vinyl polymer, the degree of stabilization needed, the end use of the resin, the presence of plasticizers and costabilizing additives, as well as the time and temperature requirements of the final processing. The presence of a stabilizing amount of from about 0.01 percent to about 15 percent by weight of the compounds of the present invention will be sufficient for most applications, although the preferred range is from about 0.25 percent to about 10.0 percent by weight of compounds of the present invention based on the weight of the polymer.

The compounds of the present invention can be advantageously employed in combination with costabilizing additives known in the art. The preferred costabilizing additives are the organic phosphites, dialkyl and diaryl phosphonates, organic and inorganic sulfites such as $Na_2SO_3$, $NaHSO_3$ and $(RO)_2SO$ where R is an alkyl or arylalkyl radical, zinc soaps, phenolic antioxidants, mercaptides, organotin compounds such as dialkyltin carboxylates or mercaptides, alkylstonnoic acid and alkylthiostannoic acid.

The compounds of the present invention can be incorporated into the polymer composition by methods familiar to one skilled in the art for the addition of similar material to the polymer blends such as by mixing in a ribbon mixer or by the intensive mixing of a Henschel™ or Welex™ mixer.

The novel compounds of the present invention can be prepared in accordance with procedures known in the art, as well as by the procedures of the following examples:

EXAMPLE 1

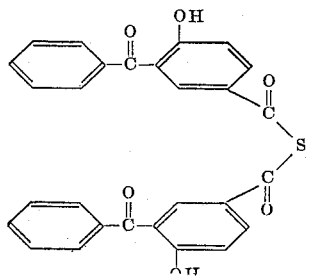

Step 1 - Preparation of 4-benzoyl-3-hydroxy-benzoyl chloride

To a 2-liter flask fitted with a gas inlet tube, condenser and stirrer is added 400 milliliters of diethyl ether, 100 grams of 2-hydroxy-benzophenone and 95 grams of stannic chloride ($SnCl_4$). The gas inlet tub is adjusted to be below the level of the diethyl ether. The mixture is brought to reflux temperature and phosgene ($COCl_2$) is slowly added to the mixture. Over a period of 3 house 50 grams of phosgene is added to the mixture. The mixture is refluxed for an additional hour after all the phosgene has been added. At the end of the reflux period the mixture is brought to room temperature. The stannic chloride is removed by washing the reaction mixture with cold 20 percent HCl, cold dilute HCl and then distilled water. The reaction mixture is then dried.

Step 2 - Preparation of 4-benzoyl-3-hydroxy-benzoic thiolanhydride

The mixture prepared in step 1 is cooled to 10° C. and is slowly added to a solution prepared from 20 grams of sodium sulfide ($Na_2S$), 6.5 grams of sodium carbonate ($Na_2CO_3$) and 5 grams of a linear alkyl benzene sulfonate in 200 milliliters of water. The mixture is held at 10° C. during the addition of the $Na_2$solution and for 3 hours after the $Na_2S$ solution and for 3 hours after the $Na_2S$ solution has been added. The 4-benzoyl-3-hydroxy-benzoic thiolanhydride is recovered by filtering from the reaction mixture and washing with water to remove inorganic impurities.

The 4-benxoyl-3-hydroxy-benzoic thiolanhydride can be used without further purification.

EXAMPLE 2

Compositions of the polymers set forth are prepared by mixing 3.0 percent by weight of the individual stabilizer set forth into the particulate polymer by a means suitable for the polymer being tested. After mixing, the stabilized composition is tested by conventional milling on a heated two roll mill to determine heat stability. The mill rolls are heated to a temperature sufficient to permit milling of the polymer and sufficiently high to degrade unstabilized polymer in 2 hours. Samples are taken from the mill every 10 minutes and evaluated. Unmilled samples are fluxed to form a homogeneous composition and are aged at ambient temperatures. The stabilizer compounds of this invention are found to provide enhanced stabilization to the polymers.

Polymer

In the manner described above, the stabilizers indicated below are evaluated sucessfully in the following polymer systems.
1. Polyethylene (density 0.915)
2. Polyethylene (density 0.945)
3. Polyropylene
4. Polyvinyl chloride
5. Polyvinylidenechloride
6 Styrene-acrylonitrile-butadiene copolymer (ABS Type B)
7. Styrene-acrylonitrile-butadine copolymer (ABS Type G)
8. Vinylchloride -vinylacetate copolymer
9. Vinylchloride-acrylonitrile copolymer.

Stabilizers

1. Compounds of the formula:
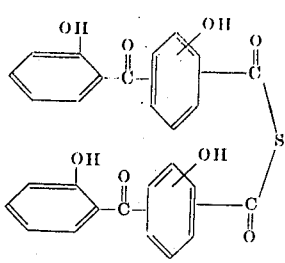
2. The compound of the formula:
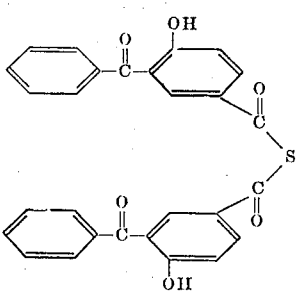

A. 4-benzoyl-3-hydroxy-benzoic thiolanhydride
B. 2,2'-dihydroxy-benzoyl-4'benzoic thiolanhydride
What is claimed is: